United States Patent [19]
Cherochak

[11] Patent Number: 4,895,653
[45] Date of Patent: Jan. 23, 1990

[54] FLOODED BOTTOM DISTRIBUTION SYSTEM

[75] Inventor: John Cherochak, Hackettstown, N.J.

[73] Assignee: Komline-Sanderson Engineering Corporation, Peapack, N.J.

[21] Appl. No.: 149,738

[22] Filed: Jan. 29, 1988

[51] Int. Cl.$^4$ ............................................. B01D 33/38
[52] U.S. Cl. .................................... 210/400; 210/405; 210/456
[58] Field of Search ............... 210/206, 216, 400, 401, 210/405, 456; 100/152; 162/336, 344

[56] References Cited

U.S. PATENT DOCUMENTS

| | | | |
|---|---|---|---|
| 3,206,396 | 9/1965 | Davis | 210/456 |
| 4,142,971 | 3/1979 | Le Fur et al. | 210/400 |
| 4,404,099 | 9/1983 | Austin | 210/400 |
| 4,595,499 | 6/1986 | Kormanik et al. | 210/216 |
| 4,609,467 | 9/1986 | Morales | 210/400 |

FOREIGN PATENT DOCUMENTS 6040698  3/1985  Japan ................................ 210/401

Primary Examiner—Richard V. Fisher
Assistant Examiner—Christopher Upton
Attorney, Agent, or Firm—Watson, Cole, Grindle & Watson

[57] ABSTRACT

A hopper for retaining a suspension is disclosed, in which the hopper is in the form of a shallow pan that is adjustable in front-to-back and side-to-side relationship so that the retention time of the suspension may be varied and an even flow from the hopper attained.

11 Claims, 4 Drawing Sheets

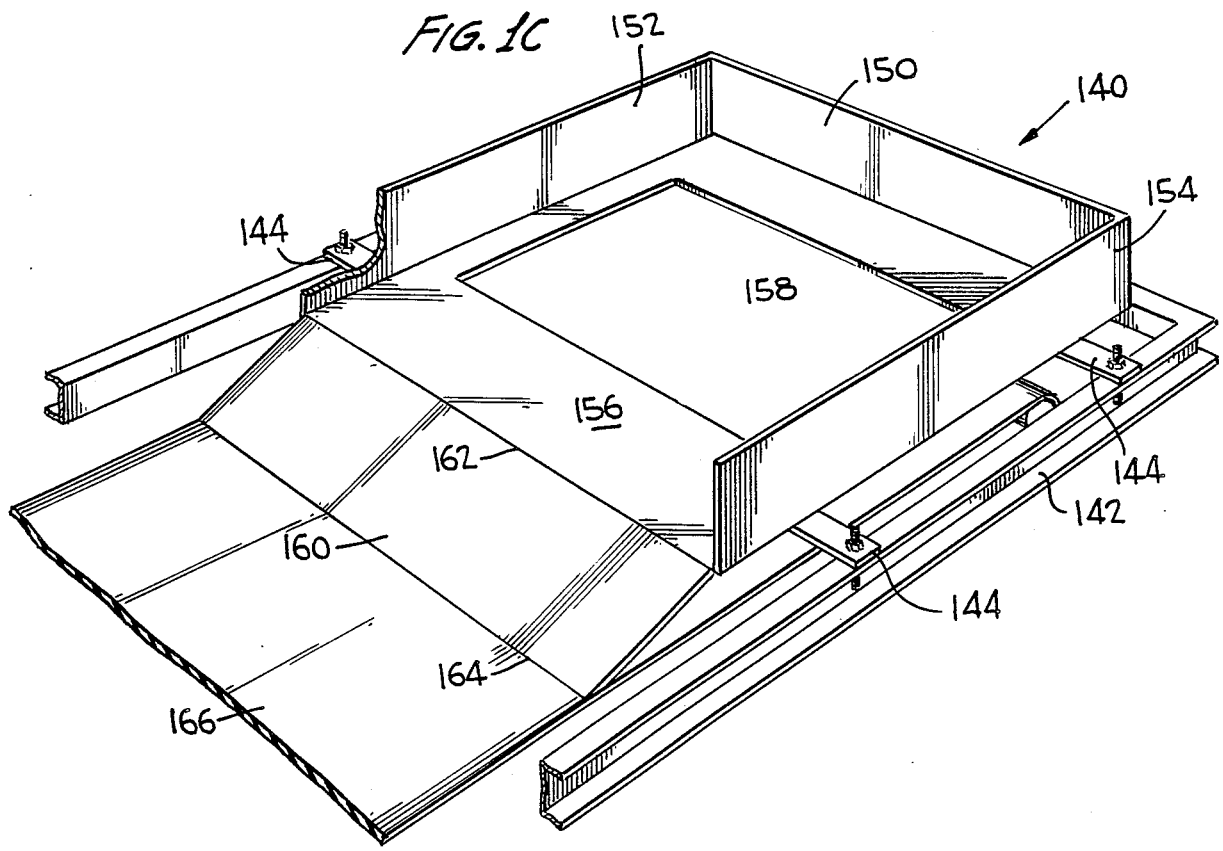
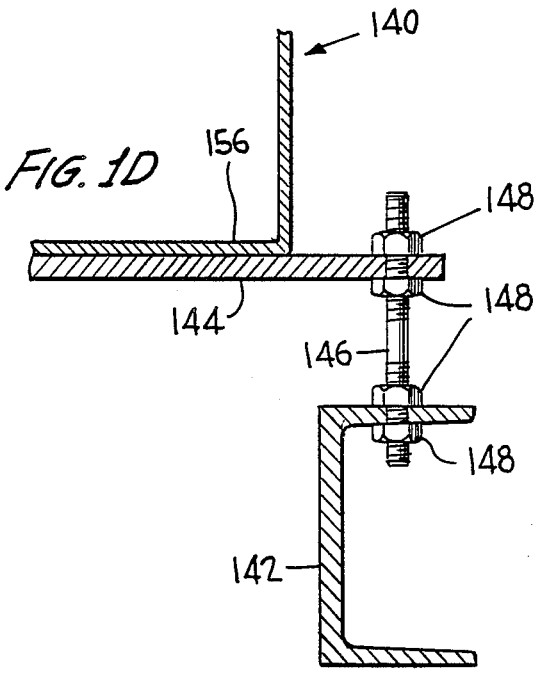

FLOODED BOTTOM DISTRIBUTION SYSTEM

BACKGROUND AND BRIEF SUMMARY OF THE INVENTION

This invention relates to method and apparatus for feeding or delivering material suspended in a liquid medium in controlled fashion to a moving endless filter such as a porous or foraminous belt or the like whereupon the liquid medium is removed or separated as a filtrate and the suspended material remains on the foraminous carrier as a cake or residue of substantially uniform thickness or depth and substantially evenly distributed across the width of the carrier. Stated otherwise, the invention relates to method and apparatus for dehydrating a liquid suspension of material to form a filter cake by draining liquid off and/or through a moving carrier to obtain a filter cake ribbon whose width is that of the carrier and having a reasonable uniformity of thickness.

Prior art efforts in this direction have concentrated on the use of physical manipulation of the material and particularly of the incipient cake as it is being formed after it is fed to the carrier as the liquid drains or is carried away, as by the physical manipulations of spreading the material transversely across the carrier and imparting uniformity of thickness with doctors, plows or the like and ultimately by dual filter belt pressing in order to achieve a filter cake or residue which conforms reasonably well with the width of the carrier and is of relatively uniform thickness.

Without eschewing the possibility of using these prior art physical manipulations to aid in achieving the desired uniformity in thickness and width of the cake, the invention disclosed and claimed herein is directed to the delivery or feed of the suspension to a belt or like foraminous carrier such that at the inception of cake formation, a more even and uniform distribution of the suspension is presented to the foraminous carrier.

In the dewatering of a suspension to form a filter cake, as for example in the treatment of sewage sludge where the water removal is effected on an endless belt filter, it is considered desirable to flocculate the material prior to its introduction onto the filter. The reason for this is to lessen premature "blinding" of the filter, which results in inefficient dewatering. That is to say, if the material migrates or settles too rapidly and/or in randomly localized fashion onto the belt or filter, premature "blinding" of the filter may result, which retards dehydration and renders it non-uniform in nature. This result is counterproductive and should be avoided to the extent possible. Thus, it is considered that the suspension of material should be of pulpy form or in the form of a flocculated suspension. The premature "blinding" effect, however, can remain a factor if the suspension is so treated as to upset or overcome the binding forces which hold the clumps or flocs of material together prior to or during distribution of the suspension onto the filter. To the degree that premature "blinding" takes place, dehydration may occur non-uniformly, more slowly than would otherwise be the case and, in general, in such fashion that the resultant filter cake is not as uniform as to thickness and moisture content as is desired or possible. It is generally considered that the suspension should be delivered to a central region onto the belt, followed by mechanical distribution of the developing filter cake uniformly as to depth and across the width of the belt during the initial dehydration of the suspension, whereafter the initially dewatered cake may be subjected to compaction and accelerated further dehydration between two filter belts traveling in unison. The method and apparatus disclosed in U.S. Pat. No. 4,142,971 (Le Fur et al.) issued Mar. 6, 1979, is exemplary of such a system.

I have found that significant improvements are possible by controlling the distribution of suspension onto the moving filter/carrier. Specifically, it is possible to load the carrier and its supporting rolls and bearings more uniformly and evenly, and favorably affect dehydration efficiency by the method and apparatus disclosed below.

Of particular importance is the method of forming a filter cake which comprises the steps of forming a flocculated suspension of particulate material in a liquid medium, controlling the velocity profiles of the flocculated suspension while discharging such suspension unidirectionally onto an endless moving filter so that the flocs or clumps of the suspended material are minimally disturbed prior to their deposition onto the moving filter and before the onset of significant separation of the liquid medium from the suspension.

An object of the invention is to form a relatively uniform ribbon discharge of suspension to the moving carrier.

Another important feature of the invention involves the method of concentrating a suspension of material which comprises the steps of feeding an even and uniform distribution of the suspension onto and across the widthwise dimension of a traveling belt or like porous carrier, draining filtrate through the carrier as it travels, and recovering concentrated material from the carrier after its moisture content has been reduced.

Another object of the invention is to form a relatively quiescent but dynamic, overflowing pool of suspension which discharges a ribbon of suspension having a substantially uniform thickness and width onto the receiving carrier.

The invention concerns apparatus for concentrating an aqueous suspension of material, which comprises the combination of endless porous belt means for separating filtrate while retaining the material, means for driving the belt means such that a flight portion thereof travels horizontally, hopper means for containing a pool of the suspension, and means for welling the suspension into the bottom of the hopper means to form a pool of suspension within the hopper means which discharges a continuous ribbon of suspension onto the porous belt means.

Another object of the invention is continuously and quiescently to well suspension upwardly to form a relatively shallow ribbon of suspension which flows gently onto a traveling porous carrier.

Another object of the invention is to form a shallow pool of suspension by welling suspension into it and to discharge a ribbon of suspension continuously at one side of the pool and onto a traveling porous carrier.

Another important feature of the invention involves the method of concentrating a suspension of material in a liquid medium which comprises the steps of forming a relatively quiescent but dynamic, overflowing pool of the suspension, discharging the suspension from the pool in the form of a ribbon having a substantially uniform thickness and width flowing unidirectionally onto a traveling, porous carrier, and recovering concentrated material of predetermined moisture content.

Another object of the invention is continuously to well suspension into a pool having a discharge side so that the suspension flows horizontally but initially omnidirectionally to maintain the pool in continuously overflowing condition to deliver a continuous and unidirectionally flowing ribbon of suspension at the discharge side of the pool onto a suitable carrier.

Another object of the invention is to form a continuous weir overflow at one side of a flooding pool of suspension by introducing the suspension generally centrally and substantially continuously and quiescently into the bottom of the pool.

Consequently, the invention involves apparatus for concentrating an aqueous suspension of material, which comprises the combination of endless porous belt means for separating filtrate while retaining the material, means for driving the belt means such that a flight portion thereof travels horizontally, hopper means for containing a pool of the suspension and including a weir transversely above the flight portion of the belt means, and means for welling the suspension into the bottom of the hopper means to form a pool of suspension within the hopper means which discharges a continuous ribbon of suspension over the weir.

A further object of the invention is to form a column of upwardly rising and uniform suspension, well it into the bottom of a pool of suspension at a sufficiently slow rate to cause the suspension being introduced to spread omnidirectionally and then channeling the suspension to flow unidirectionally from one side of the pool as a ribbon of suspension dimensioned in thickness and width for discharge onto a moving, porous carrier.

Another object of the invention is directed to apparatus for bottom flooding a pool of a suspension, such as material flocculated in a liquid medium, for discharge in the form of a ribbon-like river of such suspension onto a moving, porous carrier such as a filter belt.

A further object of the invention is to provide a method of forming filter cake and apparatus to perform the method including a moving filter belt and means for discharging a ribbon of suspended material onto the belt, which ribbon substantially covers the width of the belt with a substantially uniform depth of suspension.

In another aspect, an object of the invention is to integrate flocculation of a suspension, such as sewage sludge in an aqueous medium, while welling such stable suspension into and flooding the bottom of a pool of the suspension which overflows substantially gently onto and in substantially width-covering relation to a moving filter belt.

A further object of the invention is to control the velocity profiles of a flocculated suspension onto a moving carrier such as a filter belt, so that the flocs or clumps of the suspended material are minimally disturbed prior to their distribution onto the belt and before the onset of significant separation of the filtrate from the suspension.

The above and other objectives of this invention will become more apparent from the following preferred embodiments of my invention as described and illustrated hereinafter.

BRIEF DESCRIPTION OF THE DRAWING FIGURES

FIG. 1C is a view similar to FIGS. 1A and 1B but showing a still further modified form of hopper assembly;

FIG. 1D is an enlarged partial sectional view of FIG. 1C;

DETAILED DESCRIPTION OF THE INVENTION

Figure 2:
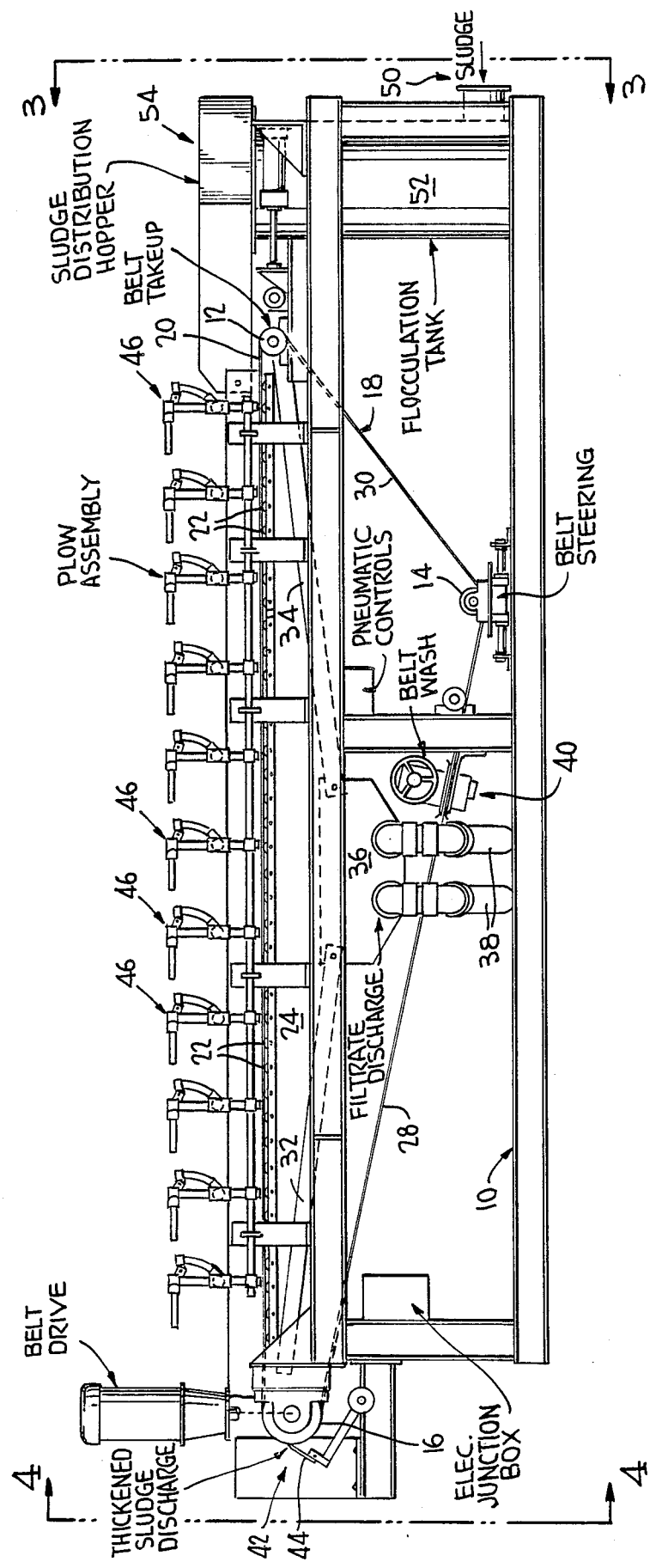
FIG. 2 is a side elevation of a sludge concentrator according to this invention.
Figure 3:
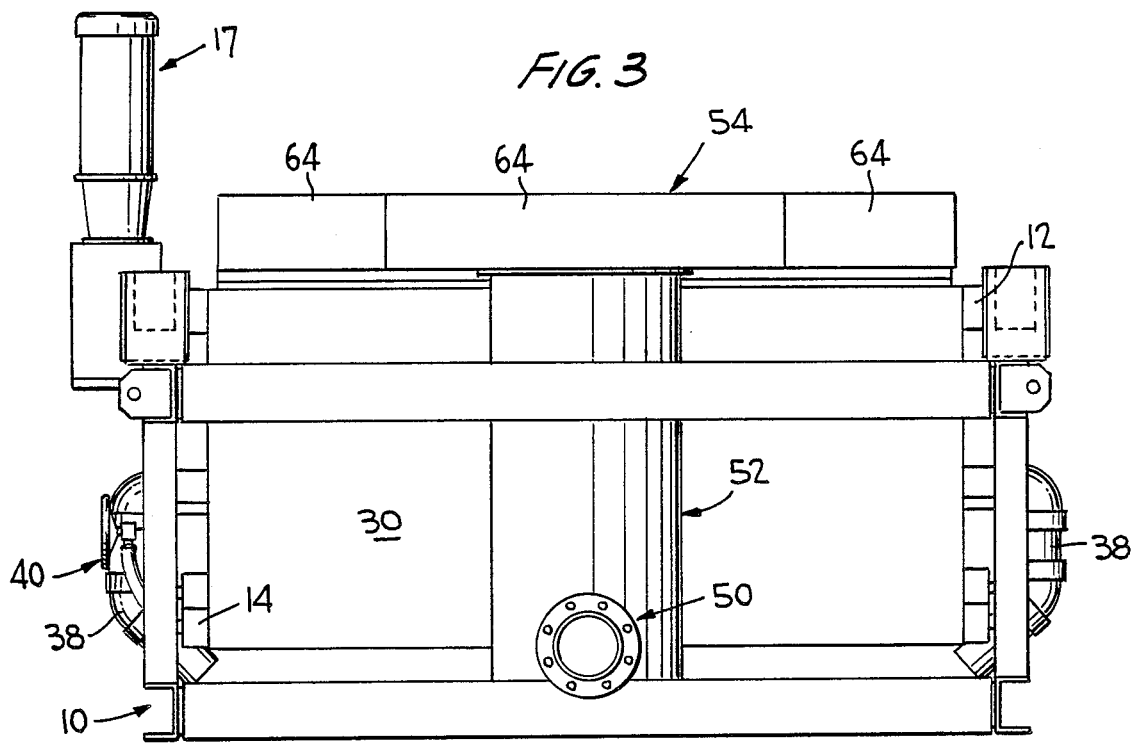
FIG. 3 is an end view of the concentrator taken from its inlet end.
Figure 4:
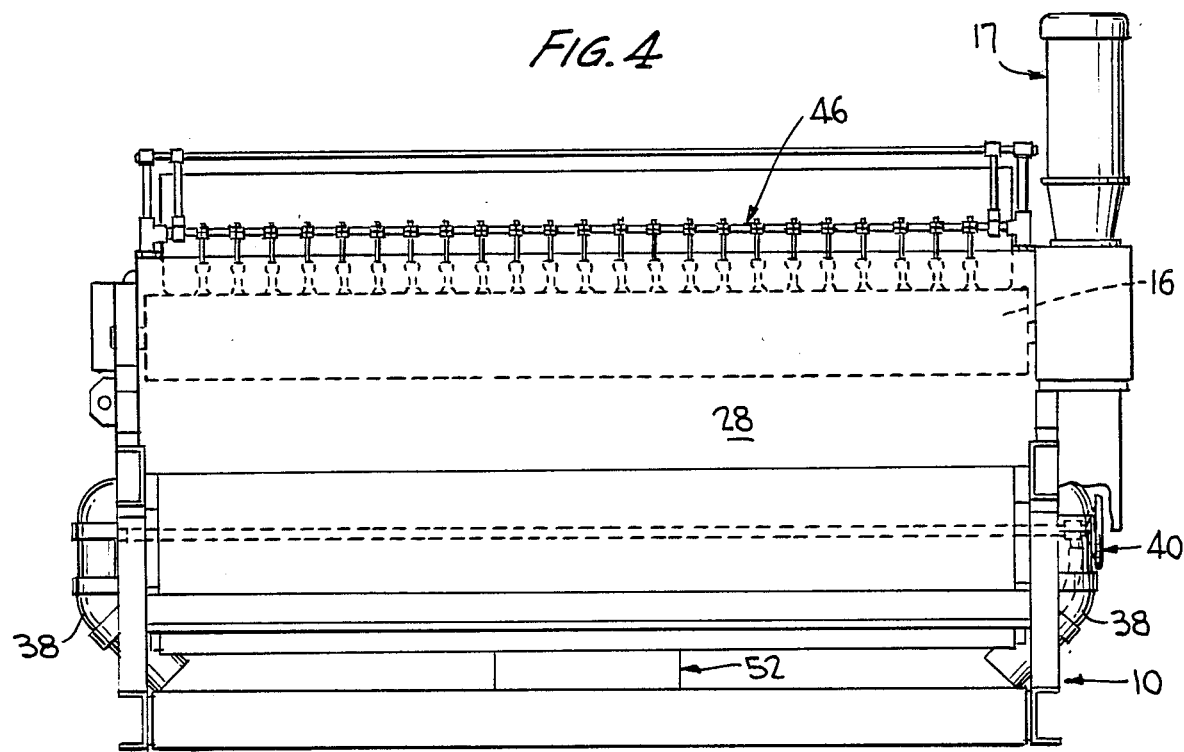
FIG. 4 is an end view of the concentrator taken from its discharge end.

As shown in FIG. 2, a sewage sludge concentrator is provided with a main frame or base 10 of any suitable construction which mounts a takeup roller 12, a belt steering roller 14 and a drive roller 16 over which the endless filter belt 18 is trained as illustrated. The upper flight 20 of the belt extend generally horizontally and is provided with transverse support rollers 22 which are journalled or otherwise supported by suitable bearings from the opposite side portions 24 of the frame. The roller 12 is mounted on the frame for longitudinal adjustment so as to set the desired tension in the filter belt, as is well known. The belt itself is of conventional construction and may be of foraminous or other porous form as is standard in the art. The lower flight portions 28 and 30 of the belt extend respectively from the drive roller 16 to the guide or steering roller 14 and from the roller 14 to the takeup roller 12. The endless belt is driven by belt drive 17 such that the upper flight 20 travels from right-to-left in FIG. 2.

Underlying the upper flight 20 are two drain gutters 32 and 34 leading to the catch basin 36 having one or more drain conduits 38 at each side thereof and which lead filtrate to waste or recovery, as is conventional. The belt washing assembly, also conventional, is indicated at 40 and operates to flush water downwardly through the belt across the full width of the belt to remove any remnant of filter cake remaining on or clinging to the sludge side of the belt. The concentrated sludge or filter cake is discharged at 42 and a conventional doctor blade 44 is used to assist such discharge and remove as much sludge from the surface of the belt as is reasonably possible. Overlying the upper flight 20 are gangs 46 of plows which may be used to penetrate the filter cake as it is being concentrated by dewatering to hasten the dehydration process.

All of the structure so far described is of conventional nature and the details of such structure may be organized as desired in accord with conventional design.

At the outlet end of the assembly, the coupling 50 is provided for connection to a sludge retention tank from which sludge is fed to the flocculation tank 52. The flocculation tank 52 is of large diameter so that the column of flocculated sludge rises slowly therein and wells into the distribution hopper assembly 54. It is preferred that additives required for flocculation be introduced at such a region as allows a substantially stable suspension to form, as by flocculation within the tank 52 itself or within the stream of sludge flowing into the tank 52 through the coupling 50, upstream of the coupling, but in any event in such a region which assures that the suspension rising within the tank 52 is in the form of a suspension having the suspended material well and uniformly dispersed therein.

Figure 1A:
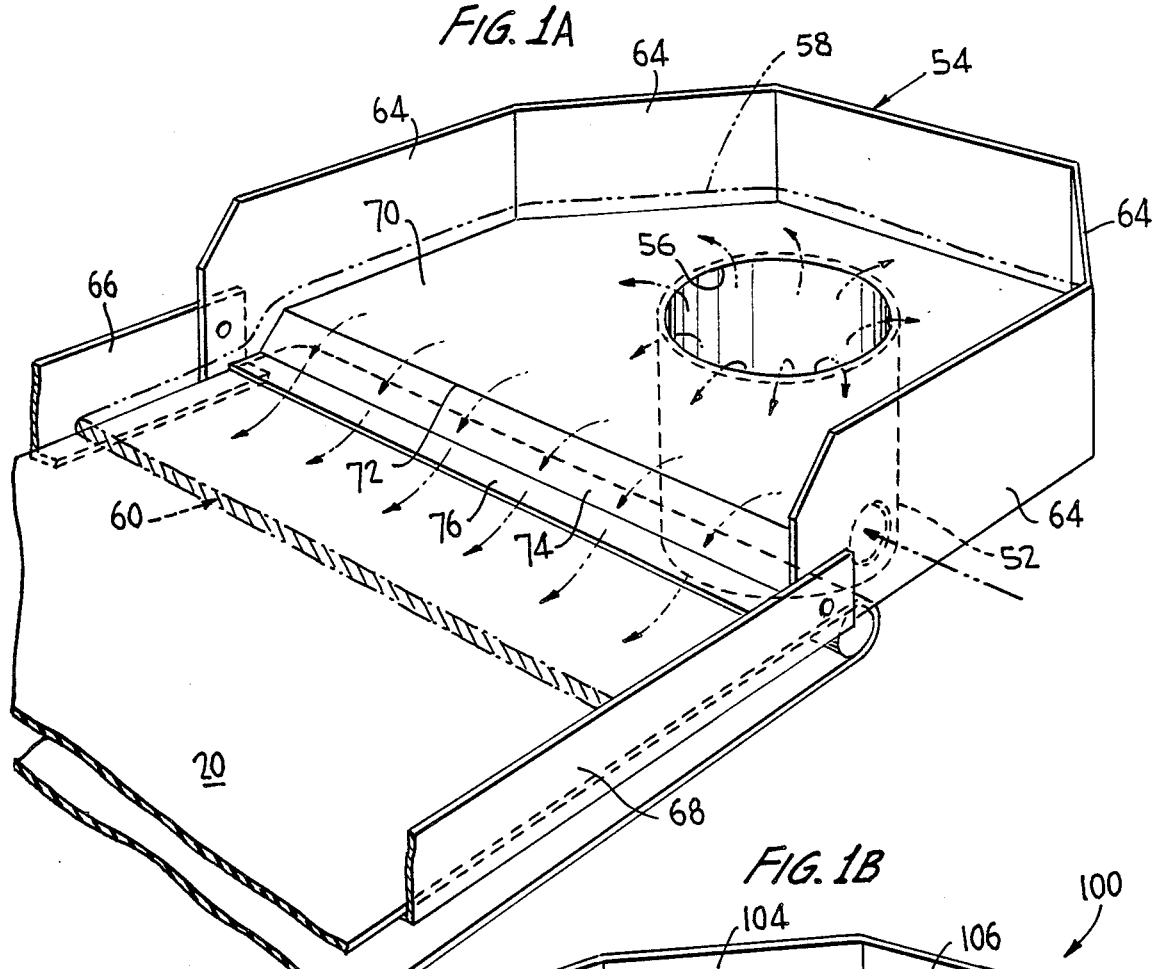
FIG. 1A is a perspective view of one form of the flocculator/hopper assembly.

Important details of the invention are illustrated in FIG. 1A. As shown in this Figure, the rising suspension of flocculated sludge overflows the open upper end or mouth 56 of the tank 52 to well upwardly through this mouth in bottom-flooding relation to the shallow pool 58 of suspension formed in the hopper assembly 54. The bottom 62 of the hopper is substantially flat and horizontal and the side wall portions 64 rise to a substantial height above this bottom. The extensions 66 and 68 which bound the opposite sides of the upper flight 20, serve to channel the suspension and retain it against any tendency to overflow the opposite sides of the upper flight. In FIG. 1A, a slightly upwardly inclined ramp portion 70 rises from the bottom wall 62 from a line of intersection near the open mouth 56 and terminates in a weir edge 72 slightly above the level of the bottom 62 to determine the depth of the pool of suspension. At the same time, this weir edge presents a continuous overflow edge for the pool of suspension over which a river of ribbon-like flow 60 of the suspension is discharged onto the upper flight 20, covering the entire or substantially the entire width of the upper flight of the belt. A multiface discharge slope 74, 76 may be employed to merge this ribbon smoothly onto the upper flight 20 which immediately underlies the portion 76.

Figure 1B:
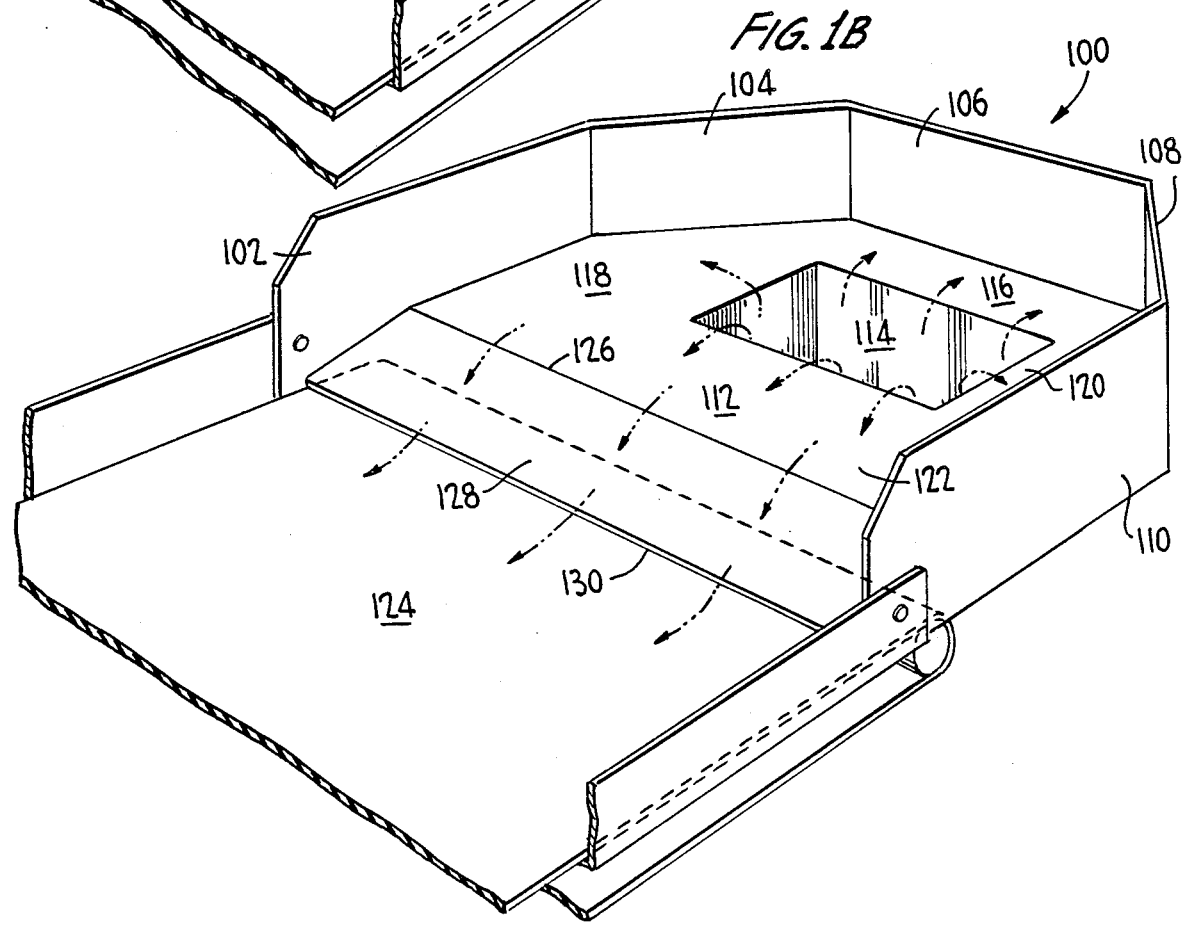
FIG. 1B is a view similar to FIG. 1A but showing a modified form of the flocculator/hopper assembly.

In the modified embodiment of FIG. 1B, no weir discharge is employed. Instead, reliance is placed upon the fact that the gentle flow of the suspension as it is welled through the mouth of the hopper means tends naturally to spread omnidirectionally at first and then to be channeled unidirectionally to flow as a continuous ribbon or river at the unrestricted discharge side of the hopper means onto the traveling carrier. Dependent upon the linear speed of the carrier and the rate of flow of the suspension as it is welled upwardly, the ribbon discharge of the suspension will be "dammed" to a greater or lesser extent by the level to which the suspension has "piled up" at the feed-in end of the belt. Given a fixed flow of welled suspension, the level of suspension in the pool and, consequently, the depth of the filter cake ribbon on the belt will become less as the belt linear velocity is increased, and vice versa. By way of example, the belt speed may vary between about 3 and 100 feet per minute and the flow rate at which the suspension is delivered may vary up to about 300 gallons per minute. These maximum values are given for a belt having a width of about one meter.

Returning to the description of FIG. 1B, the hopper means 100 as in the case of FIG. 1A includes the walls 102, 104, 106, 108 and 110 bounding three sides thereof and leaving the discharge side of the hopper assembly open. In this modification, the bottom wall 112 is substantially flat and is provided with the rectangular discharge mouth 114 through which the suspension is upwardly welled as described above. As indicated by the arrows in FIG. 1B, the upwardly welling suspension flows more or less omnidirectionally from the mouth 114, some of it flowing rearwardly over the rear section 116 of the bottom wall 112 to strike the back wall 106 and the angled walls 104 and 108, some flows over the side sections 118 and 120 to strike the side walls 102 and 110, and some flows forwardly over forward section 122 toward the filter belt 124. The various walls 102-110 redirect and channel the suspension so that it flows unidirectionally over the spill edge 126 and gently down the ramp portion 128 and onto the belt 124, so as not to break up the flocs in the suspension. The discharge edge 130 of the ramp is in substantially touching relation to the upper surface of the filter belt 124 and it is at this region in which the suspension tends to "pile up" to a greater or lesser extent depending upon the relative speed of travel imparted to the filter belt, as described above.

The flow velocity of the rising column of suspension within the tank 52 is of low enough value to present no velocity profile within the tank which will tend deleteriously to affect the floc-binding forces and thus cause premature settling or separation of the particles or fibers of material which cling together to form the flocs. The ribbon or river of suspension flowing gently from the pool which has been formed in the hopper and gently down onto the filter belt also avoids any velocity profile which will break up the flocs. With regard to the suspension itself, the solids level of the incoming sludge could typically be about 0.5-1.0% solids by weight. Such a sludge, dewatered and as it is recovered from the filter belt typically could be about 5-8% solids by weight. Calculating for a mouth 114 as in FIG. 1B which measures 20 in. x 33 in. for a one meter wide filter belt, and using the maximum incoming sludge flow rate of 300 gpm, results in a upwardly welling suspension velocity of 8.75 ft./min.

The mouth 56 in FIG. 1A, and the corresponding mouth 114 in FIG. 1B, is generally centered with respect to the bottom 62 so that the suspension welling upwardly through this mouth quiescently and gently floods the bottom of the pool as the welling suspension flows in all directions from the mouth and generally horizontally along the bottom of the hopper. The side wall portions 64 gently turn or redirect the incoming suspension particularly along the back and opposite sides of the pool 58 until the suspension is flowing unidirectionally by the time it reaches and overflows the weir edge 72 so as to be traveling in the same direction as is the upper flight 20. Thus, there is no velocity profile in the welling flow or in the conversion to unidirectional flow which adversely affects the floc-binding forces. In consequence, the width-blanketing ribbon or river 60 of suspension which overflows onto the belt upper flight is deposited or discharged thereon in substantially pristine, flocculated condition in the form of a ribbon of substantially stable suspension having a substantially uniform thickness or depth. As a result, progressive dehydration of the suspension is uniform and rapid throughout the upstream-to-downstream regions of the flight 20 and randomly localized "blinding" of the flight 20 is substantially eliminated.

The concentrated sludge recovered at the outlet end of the assembly is of substantially uniform moisture content.

FIG. 1C illustrates another embodiment of the hopper means of the invention. This embodiment demonstrates the expedient of so mounting the hopper means as to enable a limited range of adjustment relative to the traveling belt and the machine support. Thus, the hopper assembly 140 is adjustably mounted on the frame 142 through a plurality of arms 144, of which three are illustrated in FIG. 1C, and their associated studs 146 and adjusting nuts 148, see particularly FIG. 1D. The hopper includes the side walls 150, 152 and 154 rising above the bottom wall 156 which, as in the other embodiments, is provided with the generally centrally located opening 158. The open side of the hopper is provided with the downwardly sloping apron 160 intersecting the bottom wall along the line 162 so that its discharge edge 164 lies transversely across and closely adjacent the belt 166. The hopper may be leveled by adjustment of the nuts 148 to tilt the hopper assembly slightly from side-to-side and/or front-to-rear in order to achieve leveling of the hopper assembly and thus obtain the desired ribbon discharge of suspension which is of sufficient depth when it flows down the apron 100 and onto the belt and of uniform coverage from side-to-side of the belt.

Obviously, many other modifications and variations of the present invention are made possible in the light of the above teachings. It is therefore to be understood that within the scope of the appended claims the invention may be practiced otherwise than as specifically described.

What is claimed is:

1. In combination with apparatus for dewatering a suspension of material in a liquid medium, a hopper for containing a pool of the suspension and having a substantially flat bottom, and side and end walls defining a pan having an opening at one end such that the suspension exits at said open end after a relatively short period of retention in the hopper, said bottom having an orifice formed therein through which the suspension is introduced into the hopper from below the hopper, and means independent of said dewatering apparatus for tilting said hopper and its substantially flat bottom toward and away from the open, exit end of the hopper and causing such suspension to gently overflow the open end of said hopper and be discharged therefrom.

2. The combination claimed in claim 1, in which a forward portion of said substantially flat bottom of said hopper has a slope slightly upwardly inclined from adjacent rearward portions of said bottom, said forward portion being located adjacent the open end of said hopper.

3. The combination claimed in claim 2, in which said bottom of said hopper terminates at the open end of said hopper in a weir that extends transversely across said open end.

4. The combination claimed in claim 1, in which said bottom of said hopper terminates at the open end of said hopper in a weir that extends transversely across said open end.

5. The combination claimed in claim 1, further including means for tilting the hopper and its substantially flat bottom toward and away from one of said side walls of said hopper.

6. In combination with apparatus for dewatering a suspension of material in a liquid medium, a hopper for containing a pool of the suspension and having a substantially flat bottom, and end and side walls defining an opening in one end thereof such that the suspension exits at that open end after a relatively short period of retention in the hopper, said substantially flat bottom of said hopper having an orifice spaced from said end and side walls and open end of said hopper through which orifice the suspension is introduced so that the suspension flows from said orifice into the bottom of said hopper with a 360° path of flow, and means independent of said dewatering apparatus for titling said hopper and its substantially flat bottom toward and away from said open end to vary the retention time of the suspension in the hopper and cause the suspension to gently overflow the open end of said hopper and be discharged therefrom.

7. The combination claimed in claim 6, in which a weir extends transversely across the open end of said hopper, and the suspension gently overflows said weir.

8. The combination claimed in claim 6, further including means for adjusting the level of said hopper in a side-to-side direction to maintain distribution of said suspension across the open, outlet end of the hopper.

9. The combination claimed in claim 6, in which said substantially flat bottom terminates at said open end in a slightly inclined ramp that rises toward said open end.

10. The combination claimed in claim 6, in which said orifice is rectangular in cross-section.

11. The combination claimed in claim 6, in which said orifice is circular in cross-section.

* * * * *